US012762319B2

(12) United States Patent
Chonnad

(10) Patent No.: US 12,762,319 B2
(45) Date of Patent: Oct. 13, 2026

(54) DETERMINING THE LOCATION OF SAFETY MECHANISM WITHIN A CIRCUIT DESIGN

(71) Applicant: Synopsys, Inc., Sunnyvale, CA (US)

(72) Inventor: Shivakumar Shankar Chonnad, San Jose, CA (US)

(73) Assignee: Synopsys, Inc., Sunnyvale, CA (US)

( * ) Notice: Subject to any disclaimer, the term of this patent is extended or adjusted under 35 U.S.C. 154(b) by 835 days.

(21) Appl. No.: 18/131,795

(22) Filed: Apr. 6, 2023

(65) Prior Publication Data

US 2023/0325570 A1 Oct. 12, 2023

Related U.S. Application Data

(60) Provisional application No. 63/329,239, filed on Apr. 8, 2022.

(51) Int. Cl.
*G06F 30/392* (2020.01)
*G06F 119/12* (2020.01)

(52) U.S. Cl.
CPC ........ *G06F 30/392* (2020.01); *G06F 2119/12* (2020.01)

(58) Field of Classification Search
CPC .......................... G06F 30/392; G06F 2119/12
USPC .......................................................... 716/119
See application file for complete search history.

(56) References Cited

U.S. PATENT DOCUMENTS

| | | | | |
|---|---|---|---|---|
| 7,620,853 | B1 * | 11/2009 | Kasnavi | G11C 29/02 714/719 |
| 7,926,021 | B2 * | 4/2011 | Blome | G06F 30/30 716/136 |
| 11,023,357 | B1 * | 6/2021 | Hanna | G06N 20/00 |
| 2006/0282807 | A1 * | 12/2006 | Ivancic | G06F 11/3608 716/106 |
| 2007/0136700 | A1 * | 6/2007 | Wang | G06F 30/30 716/112 |
| 2009/0177936 | A1 * | 7/2009 | Koenemann | G01R 31/31703 714/E11.155 |
| 2009/0193375 | A1 * | 7/2009 | Izuha | G06F 30/39 716/113 |
| 2010/0005433 | A1 * | 1/2010 | Umezawa | G06F 30/327 716/106 |
| 2011/0302541 | A1 * | 12/2011 | Yang | G06F 30/33 716/106 |
| 2012/0079442 | A1 * | 3/2012 | Akar | G06F 30/3308 716/112 |
| 2022/0207224 | A1 * | 6/2022 | Chonnad | G06F 30/33 |
| 2022/0382943 | A1 * | 12/2022 | Chonnad | G06F 30/33 |
| 2023/0160957 | A1 * | 5/2023 | Cruz | G01R 31/31704 716/136 |
| 2024/0070367 | A1 * | 2/2024 | Chonnad | G06F 30/392 |

* cited by examiner

*Primary Examiner* — Suresh Memula
(74) *Attorney, Agent, or Firm* — Patterson + Sheridan, LLP

(57) ABSTRACT

A system and method for determining the location of safety mechanisms to be placed within a circuit design by receiving a circuit design and a safety relevant input. A first cone a first cone of influence and a first apex point of the first cone of influence are determined based on the safety relevant input. The first cone of influence includes first circuit elements of the circuit design. A location of a first safety mechanism to be placed within the circuit design is determined based on the first cone of influence and the first apex point.

19 Claims, 14 Drawing Sheets

DETERMINING THE LOCATION OF SAFETY MECHANISM WITHIN A CIRCUIT DESIGN

CROSS REFERENCE TO RELATED APPLICATIONS

This application claims the benefit of U.S. provisional patent application Ser. No. 63/329,239, filed Apr. 8, 2022, which is hereby incorporated herein by reference.

TECHNICAL FIELD

The present disclosure generally relates to a functional safety system. In particular, the present disclosure relates to determining the location of safety mechanisms within a circuit design.

BACKGROUND

Safety mechanisms (e.g., safety circuit devices) are used in safety related circuit designs to detect and/or correct faults (errors) within safety related (also referred to as safety relevant herein) logic of the safety related circuit designs. Example safety mechanisms are encoder circuitry and decoder circuitry of cycle redundancy check (CRC) circuitry, error code correction (ECC) circuitry, and parity circuitry. Encoder circuitry and decoder circuitry detect faults in transmitted data along a data path. Faults are systematic faults or random hardware faults.

An output of the safety mechanism is a diagnostic point. The signal at the diagnostic point in indicative of a fault, or faults, within the corresponding safety related logic. The signal at the diagnostic point is indicative of mismatch between the actual signal in safety related logic being monitored and an expected signal value. The mismatch corresponds to a fault, or faults, within the corresponding safety related logic. The signal at the diagnostic point is analyzed to determine if the transaction (e.g., data transfer) along the data path is to be repeated, or whether or not to transition to a safe state, among other actions to prevent a failure within a system having the safety related circuit design. A transaction is repeated when a fault is detected, and an error is indicated, to re-initiate the transaction to ensure that fault is not a transient error. A permanent fault is determined when repeated transactions yield the same fault and indicated error, as the permanent fault is not associated with a transient event.

SUMMARY

In one example, a method includes receiving a circuit design and a safety relevant input, and determining a first cone of influence and a first apex point of the first cone of influence based on the safety relevant input. The first cone of influence includes first circuit elements of the circuit design. The method further includes determining a location of a first safety mechanism to be placed within the circuit design based on the first cone of influence and the first apex point.

In one example, a method includes receiving a circuit design, a first location of a safety mechanism within the circuit design, and one of a safety relevant input or a safety relevant output. Further, the method includes determining a first cone of influence and a first apex point of the first cone of influence based on the one of the safety relevant input or the safety relevant output. The first cone of influence includes first circuit elements of the circuit design. The method further includes verifying the first location of a first safety mechanism based on the first cone of influence and the first apex point.

In one example, a system includes a memory storing instructions, and a processor. The processor is coupled with the memory and executes to receive a circuit design. Further, the processor performs path tracing within the circuit design to determine a first cone of influence and a first apex point of the first cone of influence. The first cone of influence includes first circuit elements of the circuit design. The first apex point is associated with a logical and structural convergent point within the first cone of influence. Determine a location of a first safety mechanism to be placed within the circuit design based on the first cone of influence and the first apex point.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
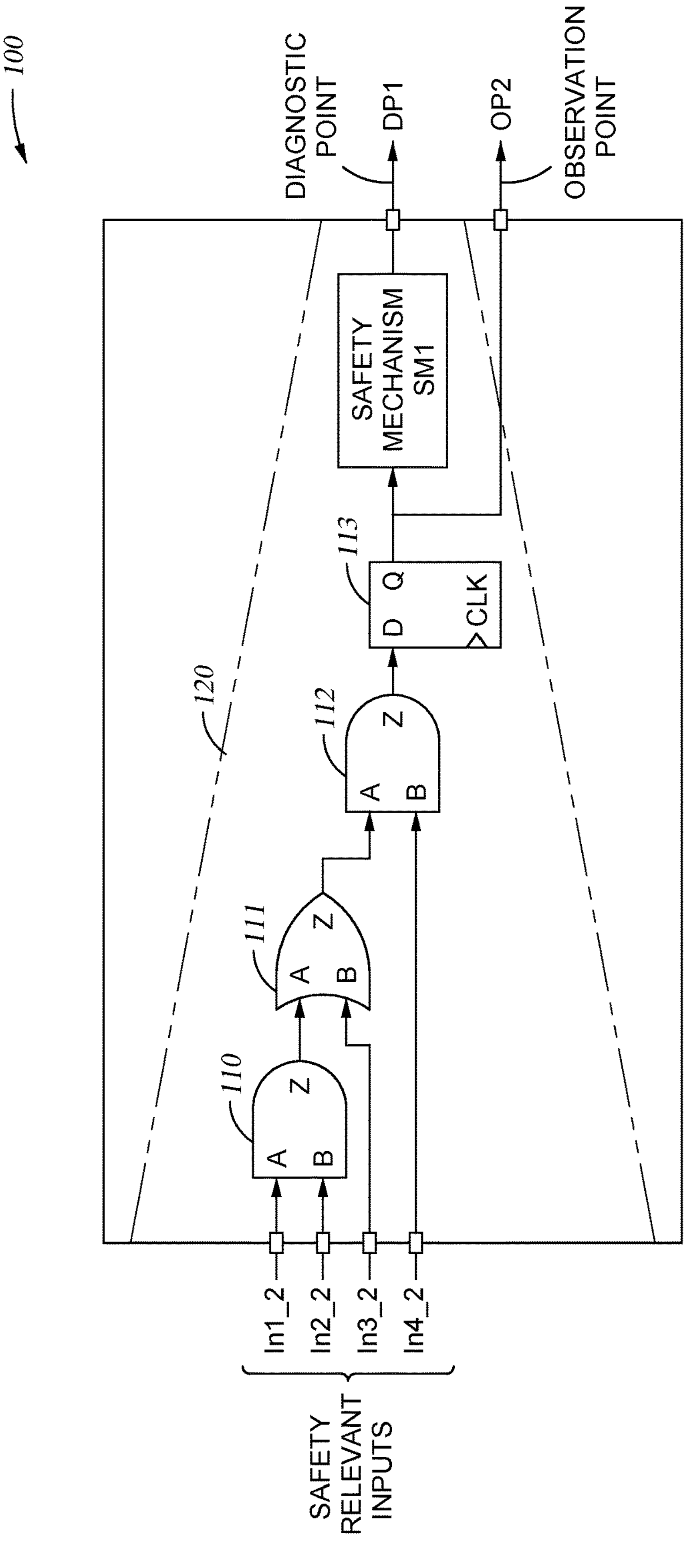
FIG. 1 illustrates a cone of influence of a circuit design in accordance with some embodiments of the present disclosure.

Aspects of the present disclosure relate to a determining the location of safety mechanisms within a circuit design. In one or more examples, aspects of the present disclosure further relate to verifying if the location of an existing safety mechanism is in its optimal location.

Safety related circuit designs prevent malfunction within the circuit designs or corresponding systems by detecting a fault and stopping a flow of current, or performing another safety measure (e.g., generating an alarm, among others). Safety related circuit designs include one or more safety mechanisms (e.g., safety circuit devices). A safety mechanism is used to detect and/or correct faults (errors) within associated safety relevant (or safety related) logic within the safety related circuit designs. The faults may violate the desired operation of the associated circuit design. The output of the safety mechanism is a diagnostic point. The signal at the diagnostic point is indicative of faults within the corresponding safety relevant logic. A fault may be a systematic faults or random hardware faults. A systematic fault is a fault that is reproducible and occurs due to an error within the corresponding circuit design. A random hardware fault is an unpredictable failure.

To detect faults within a circuit design, the safety mechanisms are placed at specific locations within the circuit design. The locations of the safety mechanisms within the circuit design are determined when generating the circuit design. In one example, the locations of the safety mechanisms are determined during a concept phase of the circuit design or during the implementation phase circuit design. However, the circuit design may be integrated with other circuit elements in a larger circuit design (e.g., an integrated circuit (IC) device), and the complete implementation of the larger circuit design is not known when determining the locations of the safety mechanisms. Accordingly, the locations of the safety mechanism or mechanisms may be inefficiently and/or inaccurately determined. Further, the locations of safety mechanisms may not be able to detect faults and/or provide the desired fault coverage. Additionally, in inherited circuit designs, the location of the safety mechanism(s) may not be able to be accurately determined as information related to the entire circuit design is not known. Placing the safety mechanisms at locations that are not able to provide the desired fault coverage may expose areas of the corresponding circuit design to undetectable faults, which may lead to failure within the circuit design and/or corresponding system, decreasing the latent fault metrics of the circuit design.

The present disclosure describes determining the locations of a safety mechanisms within a circuit design based on safety relevant inputs and/or safety relative outputs associated with the circuit design. A cone of influence (COI) is determined from a safety relevant input and/or safety relevant outputs. An apex point is determined for a COI based on the point where the inputs of the COI logically and structurally converge, or the earliest common point where the outputs logically and structurally converge to meet. As is described in further detail in the following, forward path tracing and/or backward path tracing is used to form the COI and determine the apex point. The apex point corresponds to the location of the safety mechanism.

The technical advantages of the present disclosure include, but are not limited to, using structural analysis of a circuit design to determine the location of a safety mechanism within a circuit design based on safety relevant inputs and safety relevant outputs. The structural analysis may be a static structural analysis, which reduces the user and/or processing time used to determine the location of the safety mechanism. Further, the system and method for determining the location of the safety mechanism described herein determine locations of the safety mechanisms that provide a wider coverage of the corresponding functional safety relevant logic, improving the fault detection of the safety mechanisms. Additionally, or alternatively, a predetermined location of a safety mechanism may be evaluated, to determine if the location of the safety mechanism provides the desired fault detection, and/or if moving the location of the safety mechanism is to be moved to provide the desired fault detection. In one or more examples, a report indicating the safety relevant inputs and/or outputs and corresponding apex points that each indicate a respective location for inserting a safety mechanism is generated and may be used to determine if changes to the constraints and/or the set of safety relevant inputs or safety relevant outputs are to be made, improving the fault detection performance of the circuit design.

FIG. 1 illustrates a circuit design 100. The circuit design 100 includes safety mechanism SM1 and circuit elements 110-113. Further, the circuit design 100 includes diagnostic point DP1 of the safety mechanism SM1 and the observation point OP2. A cone of influence 120 for the safety mechanism SM1 is determined based on the diagnostic point DP1. The cone of influence 120 extends from the diagnostic point DP1 to the inputs IN1_2, IN2_2, IN3_2, and IN4_2 through backward path tracing of the logic connections. The circuit elements within the cone of influence 120 are electrically coupled to the safety mechanism SM1. For example, the circuit elements 110-113 are electrically coupled to the safety mechanism SM1 and are covered by the safety mechanism SM1. This means that faults that occur within the circuit elements 110-113 are detected by the safety mechanism SM1.

A fault is an abnormal condition or error that can cause a circuit element to fail. A dangerous fault is a fault that increases the probability of a violation of a safety goal of the corresponding circuit design or system. A failure is a termination of an intended behavior of functional SR logic due to a dangerous fault. A failure mode in an element is the manner in which an element or any item fails to provide the intended behavior. A safety mechanism detects, mitigates, tolerates, controls, and/or avoids failures to maintain the intended functionality of the corresponding SR logic and/or maintain a safe state. Observation points are outputs of an element at which the potential effect of a fault may be detected. Diagnostic points are output signals of safety mechanisms. The output signals of diagnostic points may be used to detect and/or correct faults within the corresponding SR logic. Diagnostic points may be referred to as alarms, error flags, or correction flags. A fault detection timer interval (FDTI) is a time-span from the occurrence of a fault to the detection of the fault. Encoding includes converting information from a source into symbols (code symbols), or another form, for communication or storage. Decoding includes converting code symbols of a coded signal into a transmission or another form that can be understood by a recipient of the decoded signal. Error detection and correction are techniques that enable reliable delivery of data (e.g., digital data) over unreliable communication channels. Cycle redundancy check (CRC) is an error-detecting code used to detect changes to data. Parity bit, or check bit, is a bit added to a bit string. Parity bits may be used in the detection of errors, and may be an error detecting code. Parity bits are applied to the bits of a communication protocol. An error correcting code (ECC) is used in controlling errors in data over unreliable or noisy communication channels.

Figure 2A:
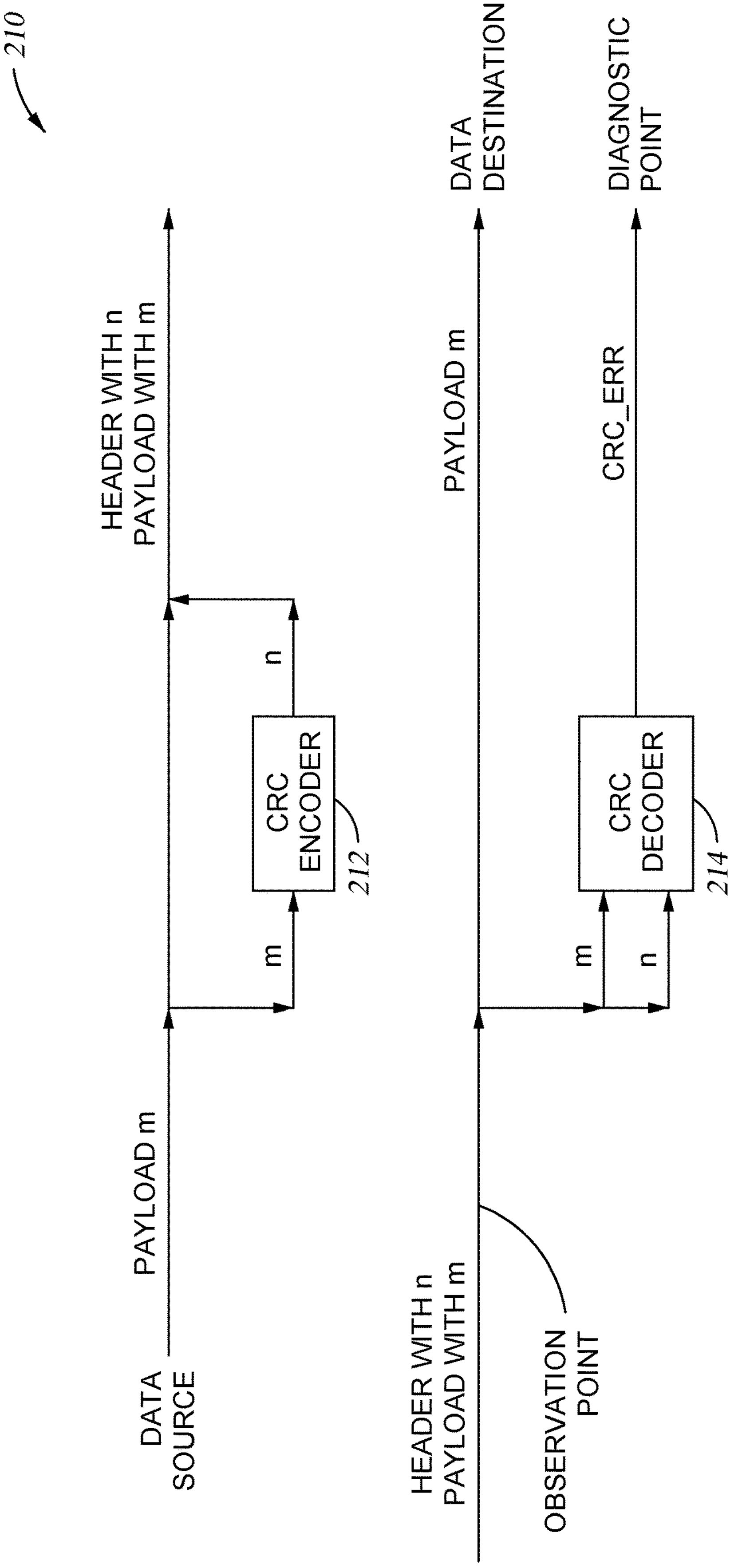
FIGS. 2A, 2B, and 2C illustrate encoding and decoding schemes in accordance with some embodiments of the present disclosure.
Figure 2B:
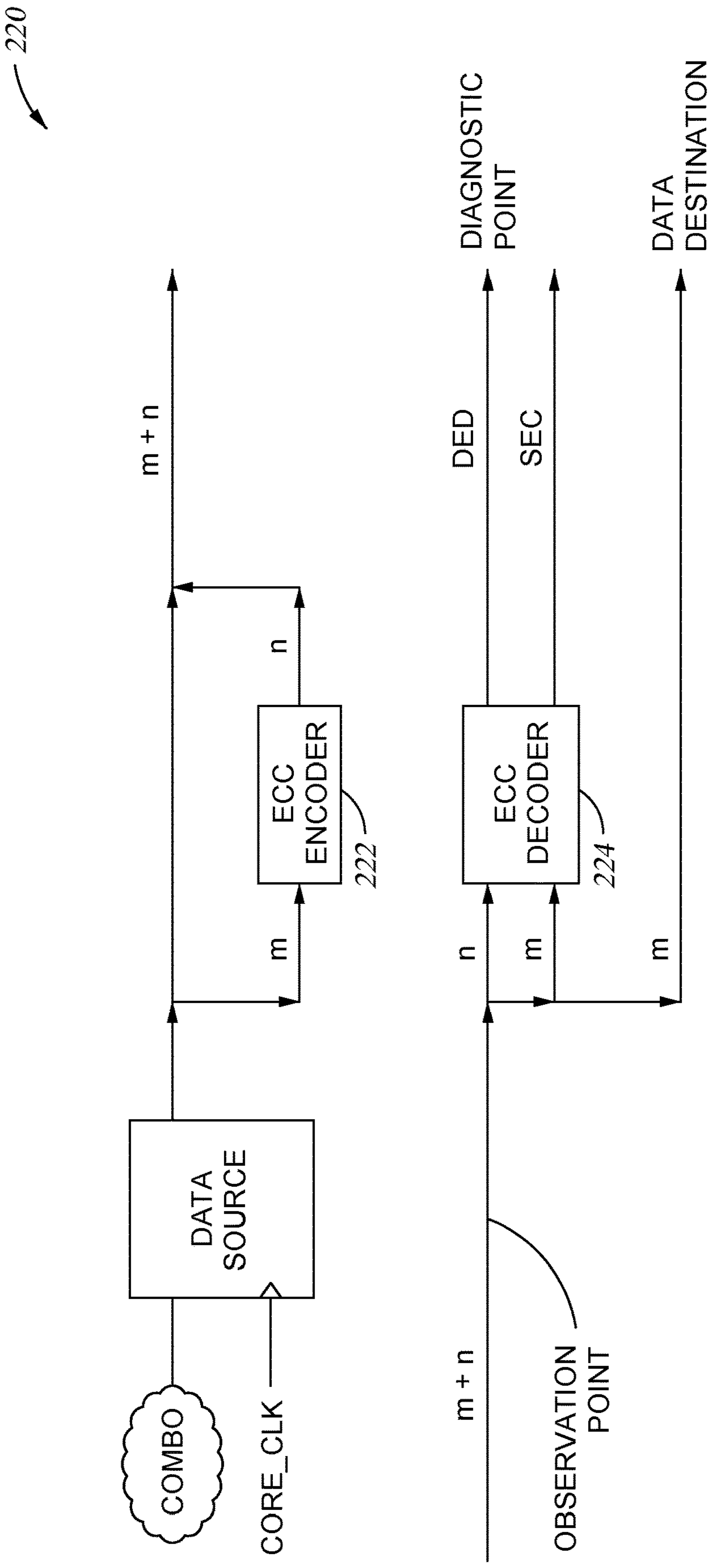
Figure 2C:
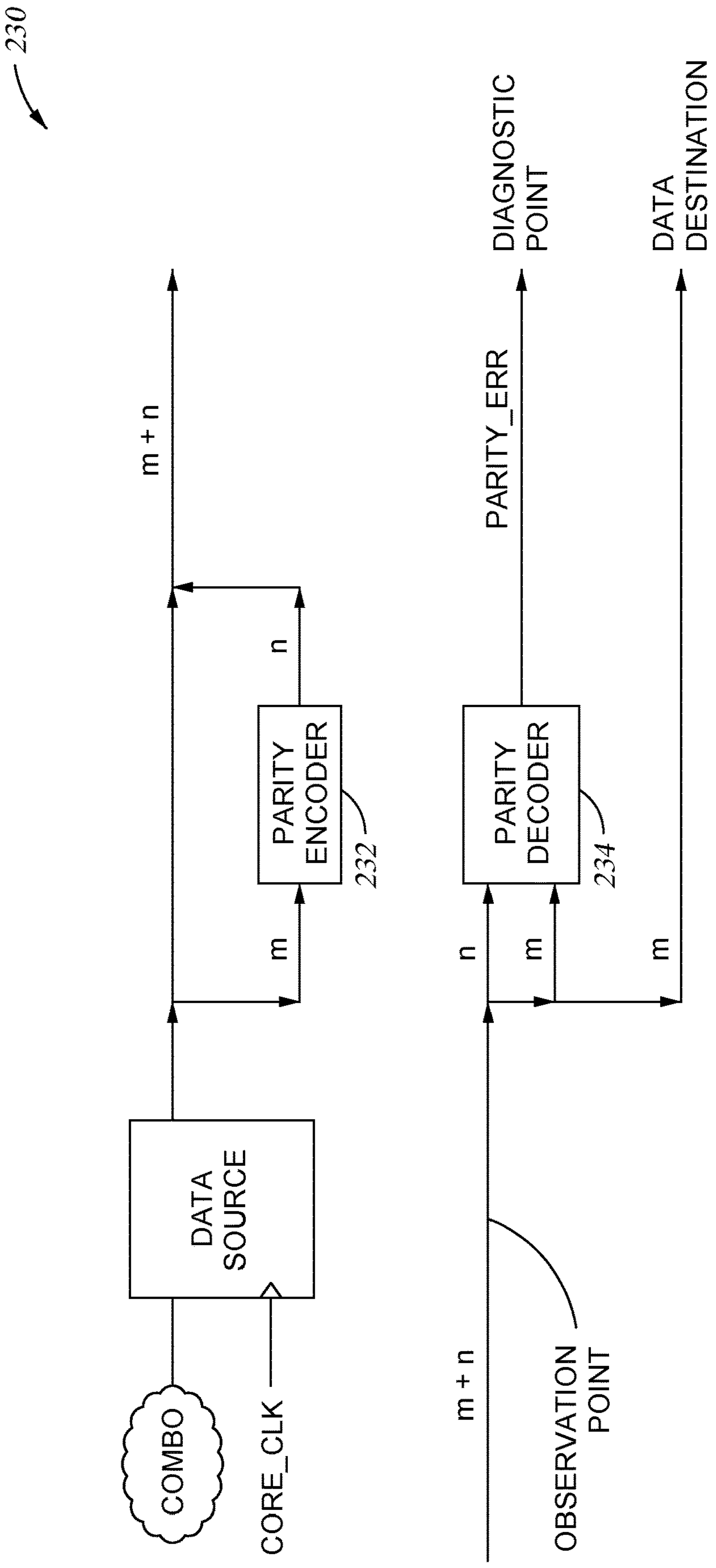

FIGS. 2A, 2B, and 2C illustrate example safety mechanisms 210, 220, and 230. The safety mechanism 210 employs a CRC scheme. The safety mechanism 210 includes CRC encoder circuitry 212 that encodes bits of payload m with syndrome bits n generating a coded signal with a header of n bits and a payload of m bits, where m and n are positive integers. The safety mechanism 210 further includes CRC decoder circuitry 214 that decodes the coded signal to generate an error signal crc_err.

The safety mechanism 220 employs an ECC scheme. The safety mechanism 220 includes ECC encoder circuitry 222 that encodes data signal m with n syndrome bits. Further, the safety mechanism 220 further includes ECC decoder circuitry 224 that decodes the coded signal to generate error signals double error detection (ded) and single error correction (sec).

The safety mechanism 230 employs a parity scheme. The safety mechanism 230 includes parity encoder circuitry 232 that encodes data signal m with n syndrome bits. Further, the safety mechanism 230 further includes parity decoder circuitry 234 that decodes the coded signal to generate error signal parity_err.

In one more examples, during the generation of a circuit design, an expected location of safety mechanisms is determined. A location of the safety mechanisms may be determined manually by a designer (user) based on judgement during a concept phase, or by an implementer, or user, during the implementation phase. However, in such implementations, the end-to-end final integrated system-on-chip (SoC) implementation is not clear upfront, and the locations of the safety mechanism or mechanisms may be inefficiently and/or inaccurately determined. Accordingly, the locations of safety mechanisms may not be able to detect faults and/or provide the desired fault coverage. Further, in large circuit designs, due to the lack of knowledge of the entire design, a designer may not be able to determine the locations of the safety mechanisms to provide the desired fault coverage. In inherited circuit designs, a designer is not able to accurately determine the location of the safety mechanism(s), as the designer does not have knowledge of the entire circuit design. Placing the safety mechanisms at locations that are not able to provide the desired fault coverage may expose areas of the corresponding circuit design to undetectable faults, which may lead to failure within the circuit design, decreasing the latent fault metrics of the circuit design.

In one or more examples, structural path analysis is used to establish a chain of connections based on the connectivity of the circuit elements of a circuit design. In one example, structural path analysis begins at an input port that feeds into a gate, and proceeds to the output of that gate, and then to the input to another gate based on the corresponding connectivity. Such a method is forward path tracing. In another example, structural path analysis begins at the output port that is driven by a gate, and proceeds to the input of the gate, and to the output of another gate. Such a method is backward path tracing. In one example, forward and backward path tracing may be used to detect and/or verify alternate paths.

In one or more examples, a probabilistic analysis may also be involved in the path tracing that can predict which paths are enabled paths and which paths are not enabled paths. Enabled paths are paths that are enabled based on the state of inputs to logic gates within a connected path. If a state of a gate is such that it enables the transfer of state to a next gate, the gate is an enabling gate. For example, an input value of logic 1 to an OR gate enables the path associated with the OR gate. An input value of logic 0 to an AND gate disables the path associated with the AND gate. In one example, probability analysis is performed on the gates in a path to dynamically determine which of the gates enable transfer of data path. In one or more examples, the probabilities of the logic setting on the inputs or nodes of the cells can be specified by the designer as a constraint.

In one or more examples, COI is determined from the functional safety relevant inputs (e.g., the source of the functional safety relevant data). An apex point is determined by the point where the inputs logically and structurally converge to meet via forward path tracing to form the COI. In one example, a COI and an apex point are selected based on constraints. The apex point corresponds to the location of the safety mechanism. Further, a COI is determined from the functional safety relevant outputs (e.g., the sink of the safety relevant data). An apex point is determined as the earliest common point where the outputs logically and structurally converge to meet via path backward path tracing to from the COI. Depending on whether the safety mechanism is of an encoder or decoder type, the apex point from either the inputs or outputs is chosen. In an example where more than one COI and apex point satisfy the constraints, the COIs and apex points satisfying the constraints are output to an administrator or another system to determine the COI and apex point to use for the location of the safety mechanism. In one or more examples, when more than one COI and apex point is determined, a path delay (e.g., timing) constraint may be used to determine the COI and apex point, which are used to determine the location of the safety mechanism with in the circuit design.

Figure 3:
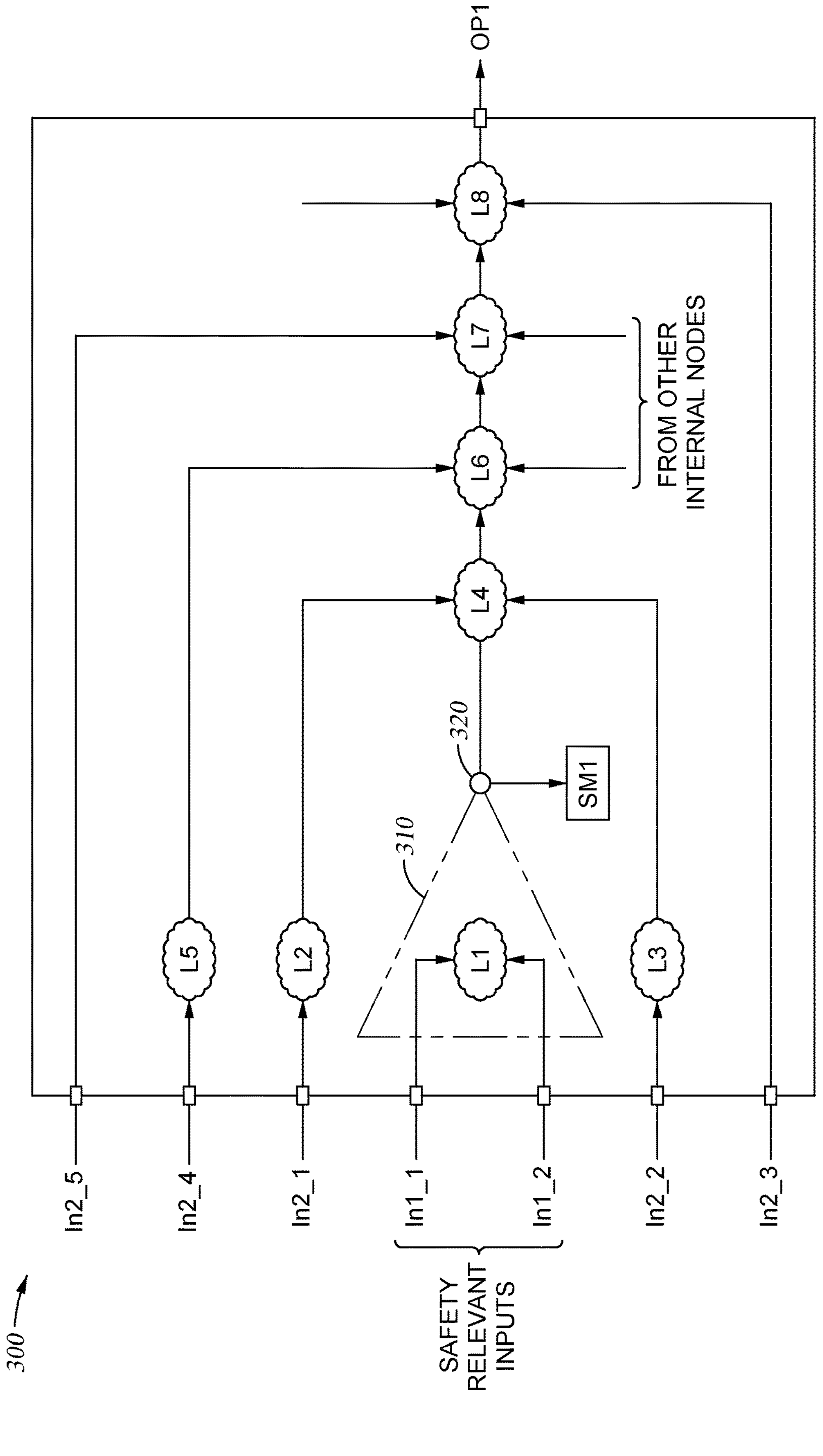
FIG. 3 illustrates a cone of influence and associated apex point and safety relevant inputs of a circuit design in accordance with some embodiments of the present disclosure.

FIG. 3 illustrates a circuit design 300. In one example, to determine the location of a safety mechanism within the circuit design 300, COI is generated through forward path tracing from the functional safety relevant inputs. The COI is used to determine the apex point or points where the inputs logically and structurally converge to meet via forward path tracing. For example, as illustrated in FIG. 3, the safety relevant inputs are In1_1 and In1_2. A safety relevant input is the source of functional safety relevant data for the circuit design. Functional safety relevant data is an input in which an incorrect value may cause a safety goal violation. The safety relevant input is an input of the corresponding circuit design that receives safety relevant data. Forward tracing is used starting at each of the inputs In1_1 and In1_2 to determine the COI 310 and the apex point 320. The apex point 320 is the apex of the COI 310. The apex point 320 is determined to be the earliest common intersection point of all of the forward traced paths from the safety relevant inputs In1_1 and In1_2. The COI 310 includes only the safety relevant inputs, according to one embodiment. In one example, the present system receives the safety relevant inputs from a user (designer) or a circuit design system. The safety mechanism SM1 is positioned at the apex point 320. Accordingly, the safety mechanism SM1 is able to detect faults associated with the circuit elements L1.

Figure 4:
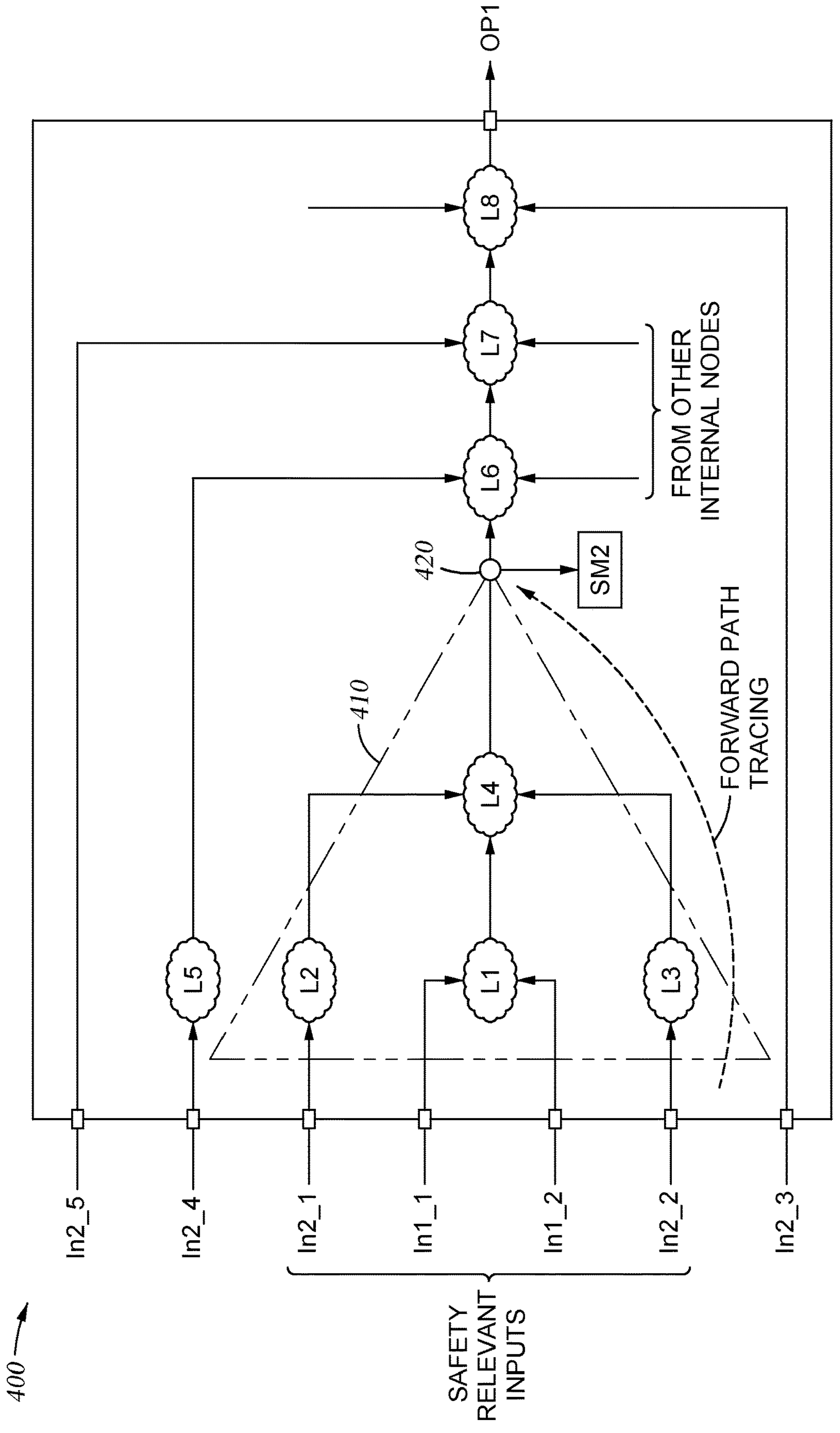
FIG. 4 illustrates a cone of influence and associated apex point and safety relevant inputs of a circuit design in accordance with some embodiments of the present disclosure.

FIG. 4 illustrates a circuit design 400. In one example, to determine the location of a safety mechanism within the circuit design 400, a COI is generated through forward path tracing from the functional safety relevant inputs. The COI is used to determine the apex point or points where the inputs logically and structurally converge to meet via forward path tracing. For example, as illustrated in FIG. 4, the safety relevant inputs are In1_1, In1_2, In2_1, and In2_2. Forward tracing is used starting at each of the inputs In1_1, In1_2, In2_1, and In2_2 to determine the COI 410 and the apex point 420. The apex point 420 is the apex of the COI 410. The apex point 420 is determined to be the earliest common intersection point of all of the forward traced paths from the safety relevant inputs In1_1, In1_2, In2_1, and In2_2. The safety mechanism SM2 is positioned at the apex point 420. Accordingly, the safety mechanism SM2 is able to detect faults associated with the circuit elements L1, L2, L3, and L4. As is illustrated in FIG. 3 and FIG. 4, as the number of inputs increases, the area of the corresponding COI increases. For example, the area of the COI 410 is greater than the area of the COI 310. The COI 410 includes a greater number of circuit elements as compared to the COI 310. In one or more examples, the apex point may move further away from the inputs depending on the levels of logic and how the paths from the safety relevant inputs structurally intersect.

Figure 5:
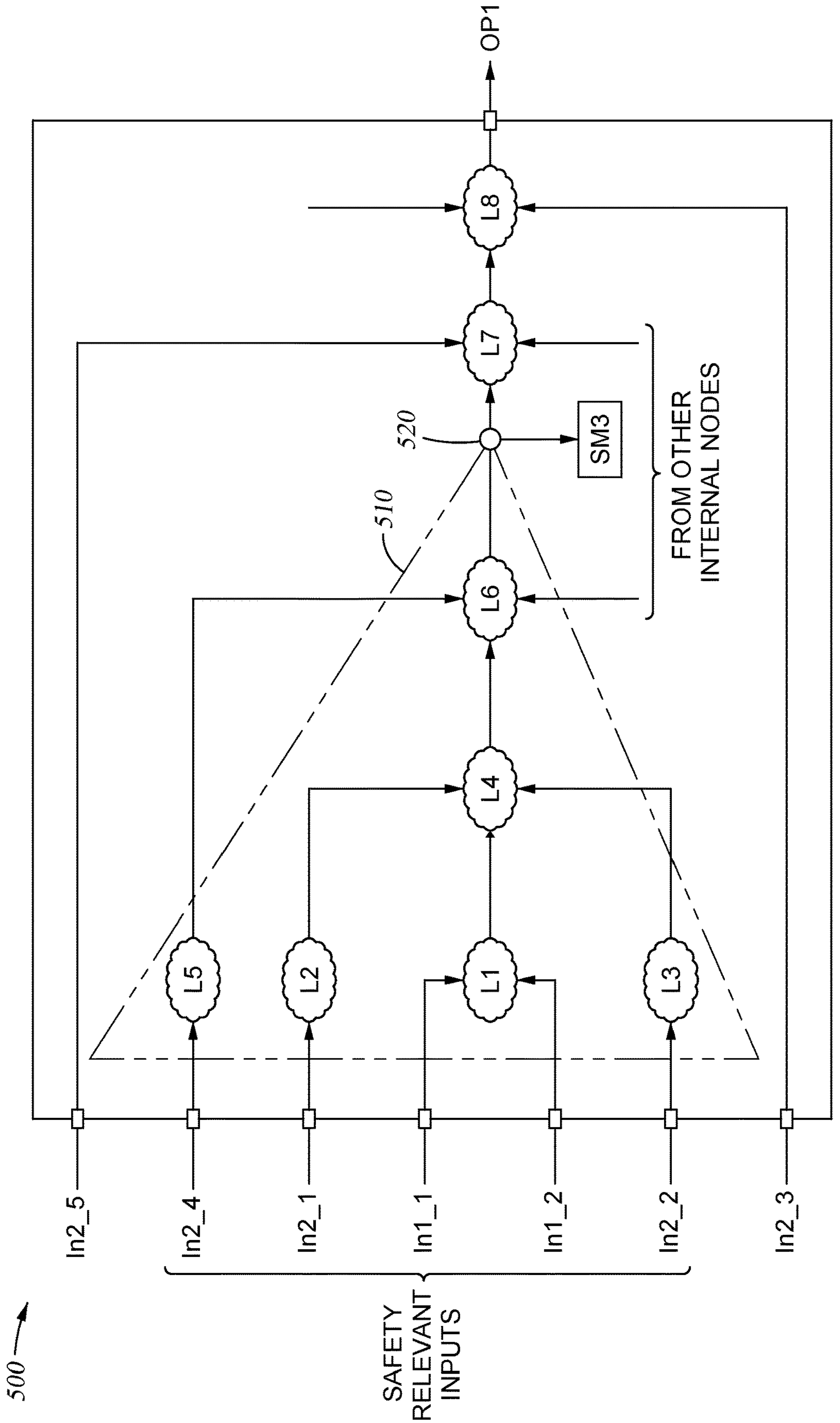
FIG. 5 illustrates a cone of influence and associated apex point and safety relevant inputs of a circuit design in accordance with some embodiments of the present disclosure.

FIG. 5 illustrates a circuit design 500. In one example, to determine the location of a safety mechanism within the circuit design 500, a COI is generated through forward path tracing from the functional safety relevant inputs. The COI is used to determine the apex point or points where the inputs logically and structurally converge to meet via forward path tracing. For example, as illustrated in FIG. 5, the safety relevant inputs are In1_1, In1_2, In2_1, In2_2, and In2_4. Forward tracing is used starting at the inputs In1_1, In1_2, In2_1, In2_2, and In2_4 to determine the COI 510 and the apex point 520. The apex point 520 is the apex of the COI 510. The apex point 520 is determined to be the earliest common intersection point of all of the forward traced paths from the safety relevant inputs In1_1, In1_2, In2_1, In2_2, and In2_4. The safety mechanism SM3 is positioned at the apex point 520. Accordingly, the safety mechanism SM3 detects faults associated with the circuit elements L1, L2, L3, L4, L5, and L6.

Figure 6:
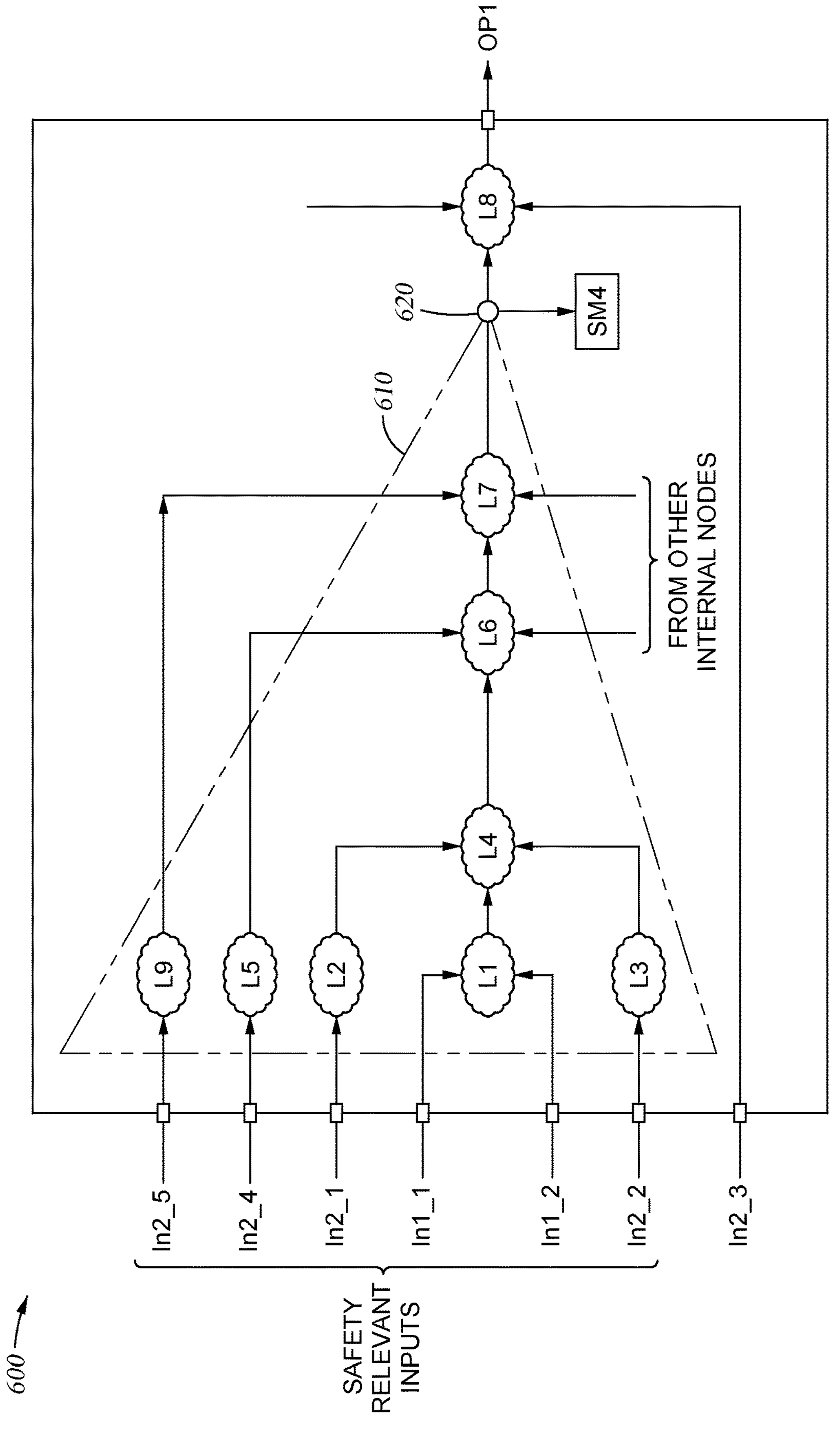
FIG. 6 illustrates a cone of influence and associated apex point and safety relevant inputs of a circuit design in accordance with some embodiments of the present disclosure.

FIG. 6 illustrates a circuit design 600. In one example, to determine the location of a safety mechanism within the circuit design 600, a COI is generated through the use of forward path tracing from the functional safety relevant inputs. The COI is used to determine the apex point or points where the inputs logically and structurally converge to meet via forward path tracing. For example, as illustrated in FIG. 6, the safety relevant inputs are In1_1, In1_2, In2_1, In2_2, In2_4, and In2_5. Forward tracing is used starting at the inputs In1_1, In1_2, In2_1, In2_2, In2_4, and In2_5 to determine the COI 610 and the apex point 620. The apex point 620 is the apex of the COI 610. The apex point 620 is determined to be the earliest common intersection point of all of the forward traced paths from the safety relevant inputs In1_1, In1_2, In2_1, In2_2, In2_4, and In2_5. The safety mechanism SM4 is positioned at the apex point 620. Accordingly, the safety mechanism SM4 detects faults associated with the circuit elements L1, L2, L3, L4, L5, L6, L7, and L9.

In one or more examples, the COI is determined such that the circuit elements of the COI (e.g., area of the logic elements within the COI) is maximized. For example, the apex of the COI is determined such that the area of the COI is a maximum amount to account for all of the selected safety relevant inputs in order to get maximum coverage.

In one or more examples, timing related constraints may be used to determine a COI. For example, timing constraints may correspond to a maximum allowable delay between an input and the location of a safety mechanism. Accordingly, the location of a safety mechanism may be determined to satisfy the timing constraints.

Figure 7:
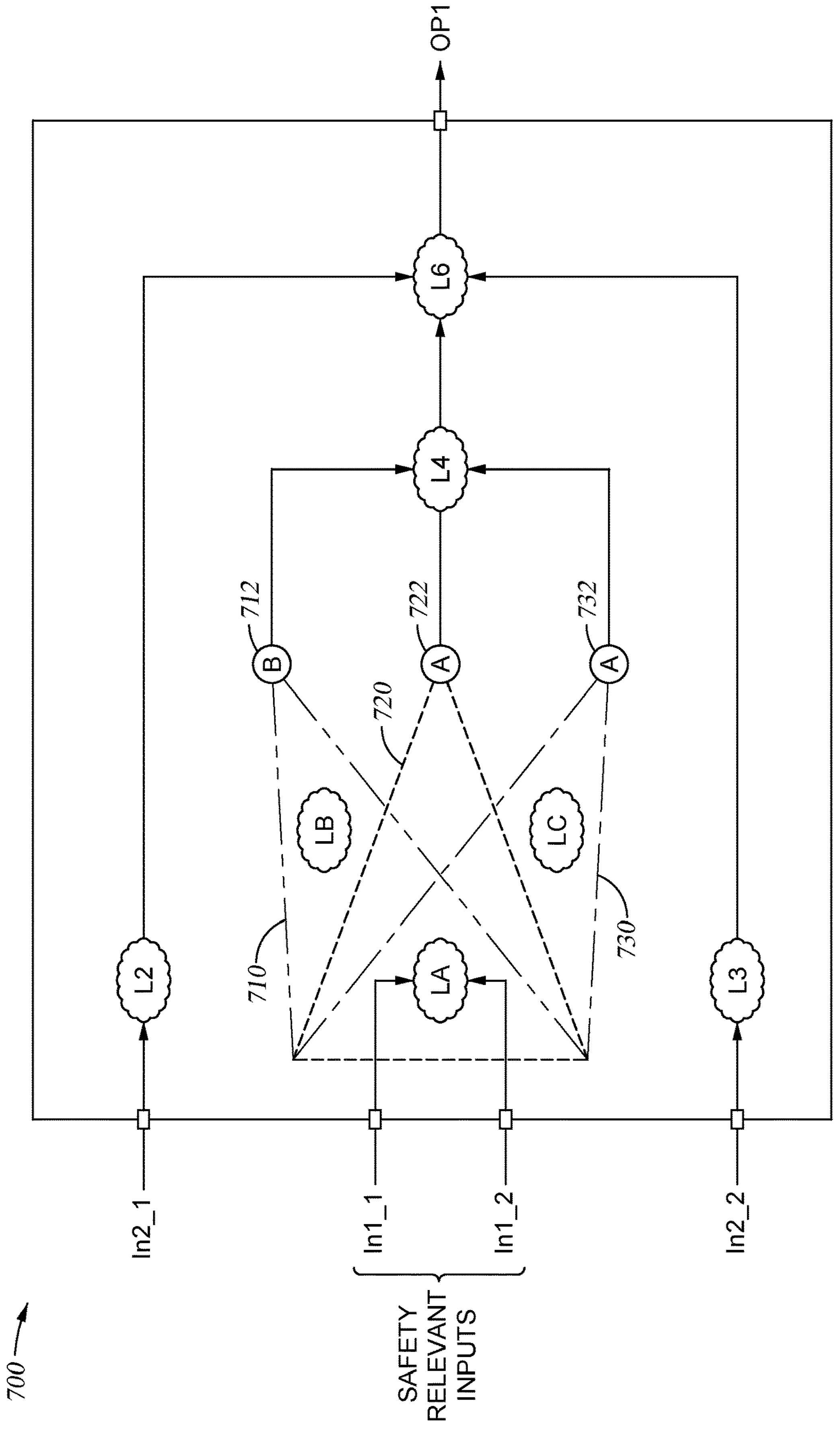
FIG. 7 illustrates an example having multiple cones of influence and associated apex points in accordance with some embodiments of the present disclosure.

FIG. 7 illustrates a circuit design 700. To determine the location of a safety mechanism within the circuit design 700, a COI is determined from the safety relevant inputs In1_1 and In1_2 using forward path tracing. However, as is illustrated in FIG. 7, three different candidate COIs 710, 720, and 730 are determined from the safety relevant inputs In1_1 and In1_2 using forward path tracing. Each of the COIs 710, 720, and 730 have a respective apex point 712, 722, and 732. The apex points 712, 722, and 732 are determined to be the earliest common intersection point of all of the forward traced paths from the safety relevant inputs In1_1 and In1_2. Further, the COI 710 includes a portion of circuit elements LA and LB, the COI 720 includes the circuit elements LA, and the COI 730 includes a portion of circuit elements LA and LC. In one example, to determine the location of a safety mechanism based on the COIs 710, 720, and 730, a constraint is used. For example, an area constraint and/or timing constraint may be used. The constraint may be used to select the location of the safety mechanism based on a desired (e.g., fastest) path/path satisfying a threshold delay and/or a COI with a desired (e.g., highest) area/area satisfying a threshold number of gates.

In one example, when multiple apex points are determined, e.g., as depicted in FIG. 7, the location of the safety mechanism may be selected based on the apex point associated with the least delay time (e.g., fastest path) and/or the apex point associated with the COI with the largest area. For example, the area (e.g., logic area) of candidate COI 710 is 110 gates, and the path delay is 2 ns. Further, the area of another candidate COI 720 is 90 gates and the path delay is 4 ns. The area of another candidate COI 730 is 120 gates and the path delay is 6 ns. The area corresponds to the number of gates (e.g., amount of circuit elements) within a COI. The area may be determined by analyzing a COI. The delay corresponds to a signal delay that occurs along a path from the safety relevant inputs to the apex point of the COI. The signal delay (e.g., path delay) may be determined based on static timing analysis.

In one example, the constraint is a COI that has the maximum area of the candidate COIs. Accordingly, the COI 730 and the apex point 732 is selected for the location of the safety mechanism. In another example, the constraint is a maximum path delay of 3 ns. Accordingly, the COI 710 and the apex point 712 is selected for the location of the safety mechanism. Further, in one example, the constraints are a COI that has the maximum area of the candidate COIs and a maximum path delay of 5 ns. Accordingly, the COI 710 and the apex point 712 is selected for the location of the safety mechanism as the area coverage of COI 710 is larger than that of COI 720.

Figure 8:
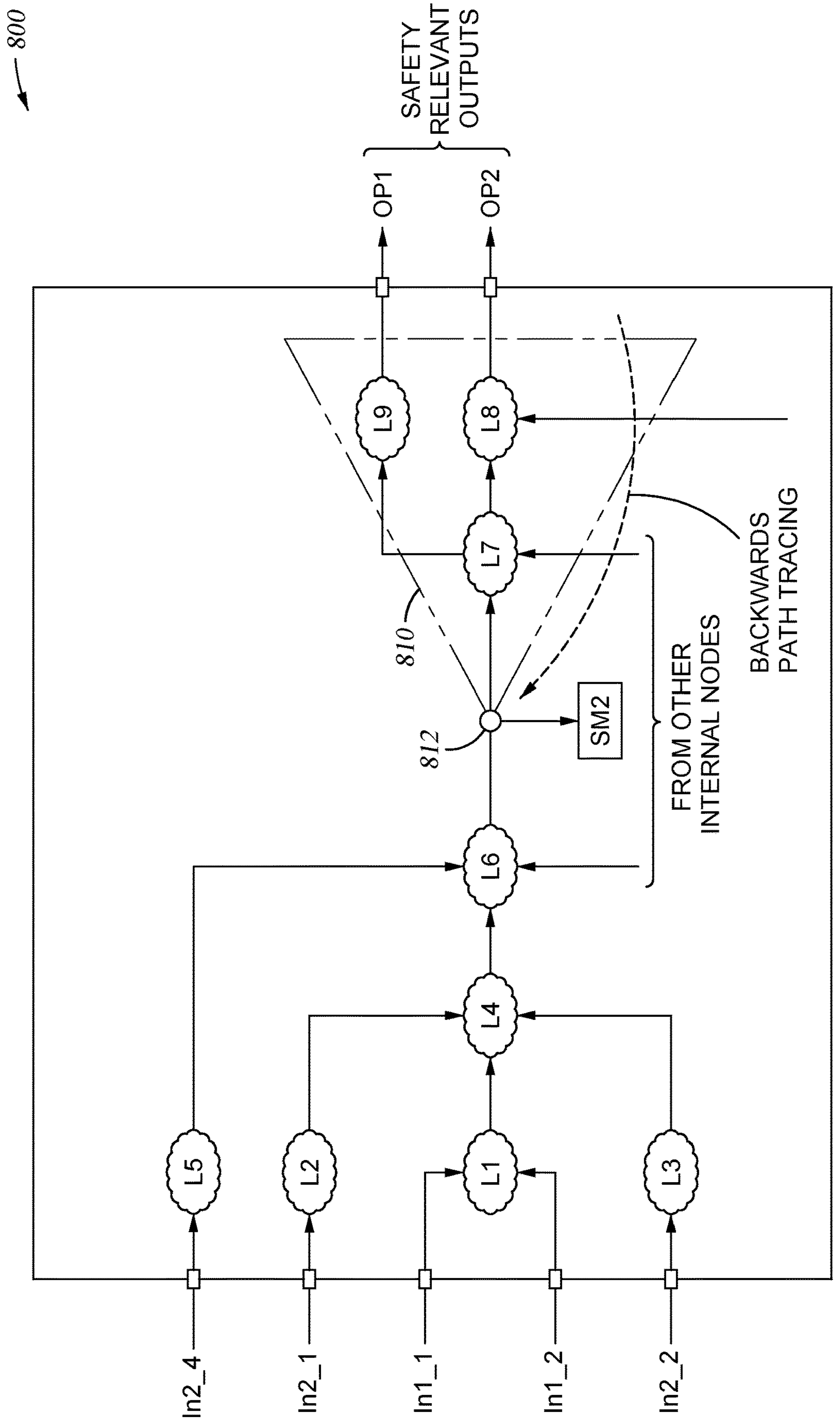
FIG. 8 illustrates a cone of influence and associated apex point and safety relevant outputs of a circuit design in accordance with some embodiments of the present disclosure.

FIG. 8 illustrates a circuit design 800. In one example, to determine the location of a safety mechanism (e.g., the safety mechanism SM2) at the output side of the circuit design 800, the COI 810 is generated by backward path tracing from the safety relevant outputs OP1 and OP2. The apex point 812 is determined from the COI 810. In one example, the COI 810 is determined to include at least portions of the circuit elements L7, L8, and L9, as the apex point 812 is the earliest common intersection point of all of the backtraced paths from the safety relevant outputs OP1 and OP2. Note, as illustrated in the example of FIG. 7, more than one apex point may be determined. In such examples, constraints as described above with regard to FIG. 7 may be used to determine the location of the safety mechanism. In one example, the area of the COI 810 is maintained below a threshold level when determining the area to include in the COI 810. Further, timing related constraints may be used to determine the area to include in the COI 810.

Figure 9:
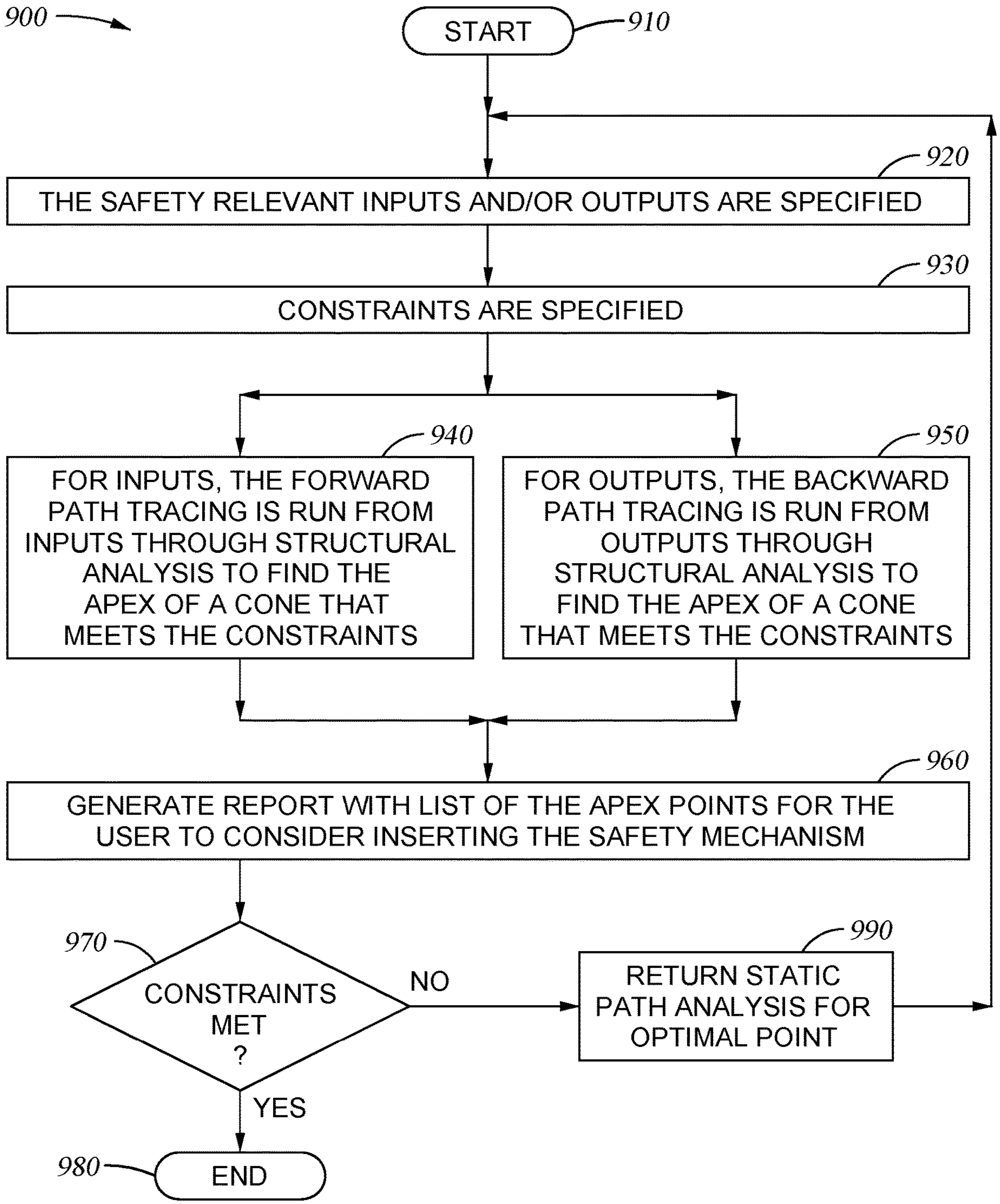
FIG. 9 depicts a flowchart of a method for determining the location of safety mechanisms within a circuit design in accordance with some embodiments of the present disclosure.

FIG. 9 is a flowchart of a method 900 for determining of the location of a safety mechanism. The method 900 may be implemented by one or more processors (e.g., the processor device 1202 of FIG. 12) executing instructions (e.g., instructions 1226 of FIG. 12) stored in a memory (e.g., the main memory 1204 and/or the machine-readable medium 1224 of FIG. 12). The method 900 includes performing static timing analysis to determine the location of a safety mechanism within a corresponding circuit design for fault detect.

At 910 of the method 900, the process is started. At 920 of the method 900, the present system receives safety relevant inputs and/or outputs. The safety relevant inputs and/or outputs are received from a user or another computer system based on the corresponding circuit design. At 930 of the method 900, the present system receives constraints for selecting a COI. The constraints include a timing constraint and/or an area constraint, among others. In one example, the constraints are received from a user or another computer system based on the corresponding circuit design. At 940 of the method 900, forward path tracing is applied to the safety relevant inputs to determine the candidate COI or COIs and corresponding apex points. In one or more examples, one or more COIs and corresponding apex points are selected from the candidate COI or COIs based on the constraints specified in 930. In one example, a selected COI is determined to have a maximum area of the candidate COIs from the safety relevant inputs to an apex point.

At 950 of the method 900, backward path tracing is applied to the safety relevant outputs to determine the candidate COI or COIs and corresponding apex points. In one or more examples, one or more COIs and corresponding apex points are selected from the candidate COI or COIs based on the constraints specified in 930. In one example, a selected COI is determined to have a maximum area of the candidate COIs from the safety relevant outputs to an apex point. It is appreciated that 940 and 950 of the method 900 can be performed in any order or simultaneously without deviating from the scope of the present disclosure. In one or more examples, 940 of the method 900 or 950 of the method 900 may be omitted. In one example, 940 of the method 900 is performed to determine the location of a safety mechanism based on safety relevant inputs. In such an example, 950 of the method 900 may be omitted if no safety relevant outputs are specified at 920 of the method 900. Further, in one example, 950 of the method 900 is performed to determine the location of a safety mechanism based on safety relevant outputs. In such an example, 940 of the method 900 may be omitted if no safety relevant inputs are specified at 920 of the method 900.

At 960 of the method 900, a report is generated indicating the safety relevant inputs and/or outputs and corresponding apex points that each indicate a respective location for inserting a safety mechanism. The report may be saved to a memory (e.g., the main memory 1204 of FIG. 12), communicated to another system, or displayed on a display device.

At 970 of the method 900, a determination as to whether or not the constraints are met is made. If the constraints are met, the method 900 ends at 980. If the constraints are not met, the process returns to 920 upon revised constraints or desired implementation changes and is repeated until the constraints are met. In one example, based on a determination at 970 that the constraints are not met, the optimal point that meets the constraints closest to the input specification is reported to the user or another system with associated area data and/or timing data. Additionally, or alternatively, based on a determination at 970 that the constraints are not met, static path analysis is performed for the optimal point and 990 before returning to 920. The optimal point and associated area data and timing data may be used to determine if changes to the constraints and/or the set of safety relevant inputs or safety relevant outputs are to be made. The updated constraints and/or safety relevant inputs or safety relevant outputs may be used by 940 and 950 of the method 900.

Figure 10:
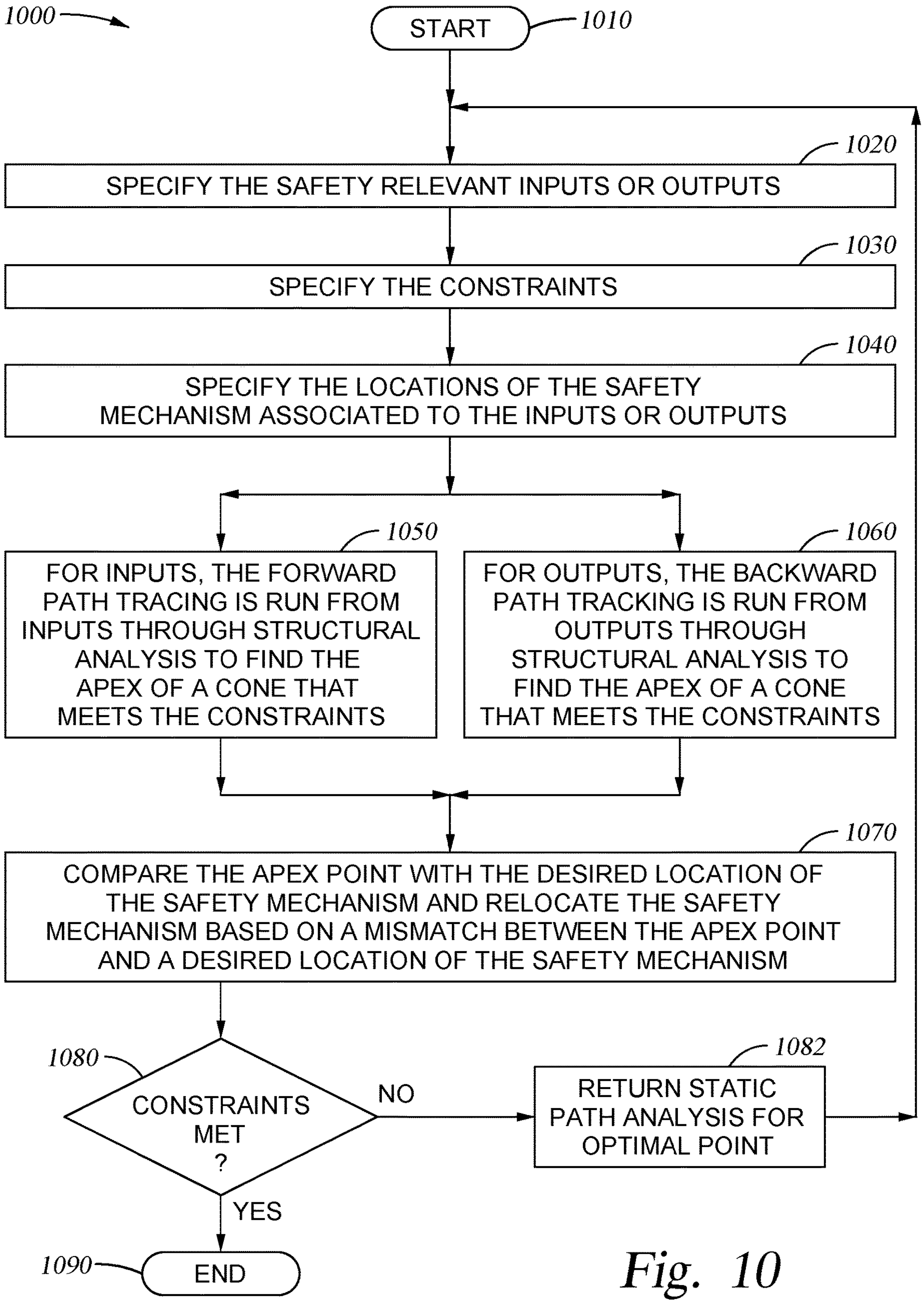
FIG. 10 depicts a flowchart of a method for verifying the location of safety mechanisms within a circuit design in accordance with some embodiments of the present disclosure.

FIG. 10 is a flowchart of a method 1000 for verifying the location of a safety mechanism that is already placed in a circuit design. The method 1000 is implemented by one or more processors (e.g., the processor device 1202 of FIG. 12) executing instructions (e.g., instructions 1226 of FIG. 12) stored in a memory (e.g., the main memory 1204 of FIG. 12). The method 1000 includes performing static analysis to determine whether an implemented safety mechanism is in the correct location within the corresponding circuit design for fault detect.

At 1010 of the method 1000, the process is started. At 1020 of the method 1000, the present system receives safety relevant inputs and/or outputs. The safety relevant inputs and/or outputs are received from a user or a computer system based on the corresponding circuit design. At 1030 of the method 1000, the present system receives constraints. The constraints include a timing constraint and/or an area constraint, among others. In one example, the constraints are received from a user or a computer system based on the corresponding circuit design.

At 1040 of the method 1000, the present system receives the locations of the safety mechanism or mechanisms associated with the safety relevant inputs and/or safety relevant outputs. The locations of the safety mechanism or mechanisms are received from a user or a computer system based on the corresponding circuit design.

At 1050 of the method 1000, forward path tracing is applied to the safety relevant inputs to determine the COI or COIs and corresponding apex points. In one example, a COI is determined to a maximum area from the safety relevant inputs to an apex point. One or more COIs and corresponding apex points may be determined.

At 1060 of the method 1000, backward path tracing is applied to the safety relevant outputs to determine the COI or COIs and corresponding apex points. In one example, a COI is determined to a maximum area from the safety relevant outputs to an apex point. One or more COIs and corresponding apex points may be determined.

It is appreciated that 1050 and 1060 of the method 1000 can be performed in any order or simultaneously without deviating from the scope of the present disclosure. In one or more examples, 1050 of the method 1000 or 1060 of the method 1000 may be omitted. In one example, 1050 of the method 1000 is performed to determine the location of a safety mechanism based on safety relevant inputs. In such an example, 1050 of the method 1000 may be omitted if no safety relevant outputs are specified at 1020 of the method 1000. Further, in one example, 1060 of the method 1000 is performed to determine the location of a safety mechanism based on safety relevant outputs. In such an example, 1050 of the method 1000 may be omitted if no safety relevant inputs are specified at 1020 of the method 1000.

At 1070 of the method 1000, the apex point(s) determined by the forward or backward path tracing are compared against the existing specified location(s) of the safety mechanism or mechanisms (from 1040). If the apex points do not match the determined expected locations of the safety mechanisms, the location of the safety mechanism may be relocated to the desired apex points. In one example, a report is generated indicating the apex points and the locations of the safety mechanism or mechanisms. The report may be saved to a memory (e.g., the main memory 1204 of FIG. 12), communicated to another system, or displayed on a display device. In one example, by relocating safety mechanisms, coverage of the functional safety relevant logic is increased (e.g., widened). Accordingly, the number of single point and latent faults are reduced and the Single Point Fault Metric (SPFM) and the Latent Fault Metric (LFM) are improved.

At 1080 of the method 1000, a determination as to whether or not the constraints are met is made. If the constraints are met, the method 1000 ends at 1090. If the constraints are not met, the process returns to 1020 and is repeated with suitable changes to the constraints or the implementation, until the constraints are met.

In one example, based on a determination at 1080 that the constraints are not met, the optimal point (location) that meets the constraints closest to the input specification is reported to the user or another system with associated area data and/or timing data. Additionally, or alternatively, based on a determination at 1080 that the constraints are not met, static path analysis is performed for the optimal point and 1082 before returning to 1020. The optimal point and associated area data and timing data may be used to determine if changes to the constraints and/or the safety relevant inputs or safety relevant outputs are to be made. The updated constraints and/or safety relevant inputs or safety relevant outputs are used by 1050 and 1060 of the method 1000.

In one or more examples, the method 900 and the method 1000 may be used as part of system design 1114 and/or logic design and functional verification 1116 of FIG. 1. Further, the method 900 and the method 1000 determine the location of safety mechanisms without the use of qualitative through expert judgement and the analysis of the circuit design is not subjective, instinctive, or interpretive. The method 900 and the method 1000 provide realistic results as per actuals, not assumed results based on a designer's knowledge. Further, the method 900 and the method 1000 provide traceable evidence of analysis in the form of reports with diagnostic coverage data that may be presented to a functional safety assessor, and used in the safety assessment of the corresponding circuit design.

In one or more examples, the methods 900 and 1000 provide a process for determining the location of a safety mechanism that has a high ease of use for a designer as only the functional safety relevant inputs and outputs, and, for the method 1000 the location of the safety mechanisms, are specified by a user. Further, as compared to current methods for determining the location of the safety mechanisms, the accuracy of the locations as determined by the methods 900 and 1000 is higher. Further, the methods 900 and 1000 are faster as compared to current methods and employ a quantitative analysis as the area and timing constraints of a circuit design are used in determining the locations. The methods 900 and 1000 further improve the diagnostic coverage (DC) of the circuit design by more accurately determining the locations of the safety mechanisms. In one example, the methods 900 and 1000 may be applied at the register transfer level (RTL) and netlist levels of a circuit design.

In one or more examples, the type of safety mechanism to be chosen should be relevant to the intended purpose i.e., a CRC/ECC encoder or decoder is apt for a data path related functional safety relevant inputs or outputs. In an examples where multiple constraints, e.g., timing and/or area, are considered, one of the constraints is selected as the primary constraint (e.g., has a higher priority). In one example, if location of the safety mechanism is determined to be too far away from the safety relevant inputs or outputs, size of the set of safety relevant inputs or outputs for which the safety mechanism is to be placed is reduced. In one or more examples, based on the constraints, the set of inputs appropriate to meet the constraints can be specified. Further, in one or more examples, the safety relevant inputs and outputs are specified by the user or by one or more processors of a computer system executing instructions stored in a memory. In one or more examples, one or more of the safety relevant inputs and outputs may not be necessarily at the top level of the circuit design, but derived from logic within the circuit design, which are also specified. In one or more examples, the above described method of determining the location of a safety mechanism within a circuit design may be used also used to verify the location of existing safety mechanisms. In such an example, as illustrated in FIG. 10, the location of the existing safety mechanisms is provided.

In one or more examples, for each safety mechanism and the associated functional safety relevant inputs/outputs, the corresponding logic is checked through path tracing in static analysis. The location of a safety mechanism, e.g., the apex of the COI and the criteria, e.g., area and timing criteria may be reported to user. The reports may be used as evidence during functional safety assessments of the corresponding circuit design.

Figure 11:
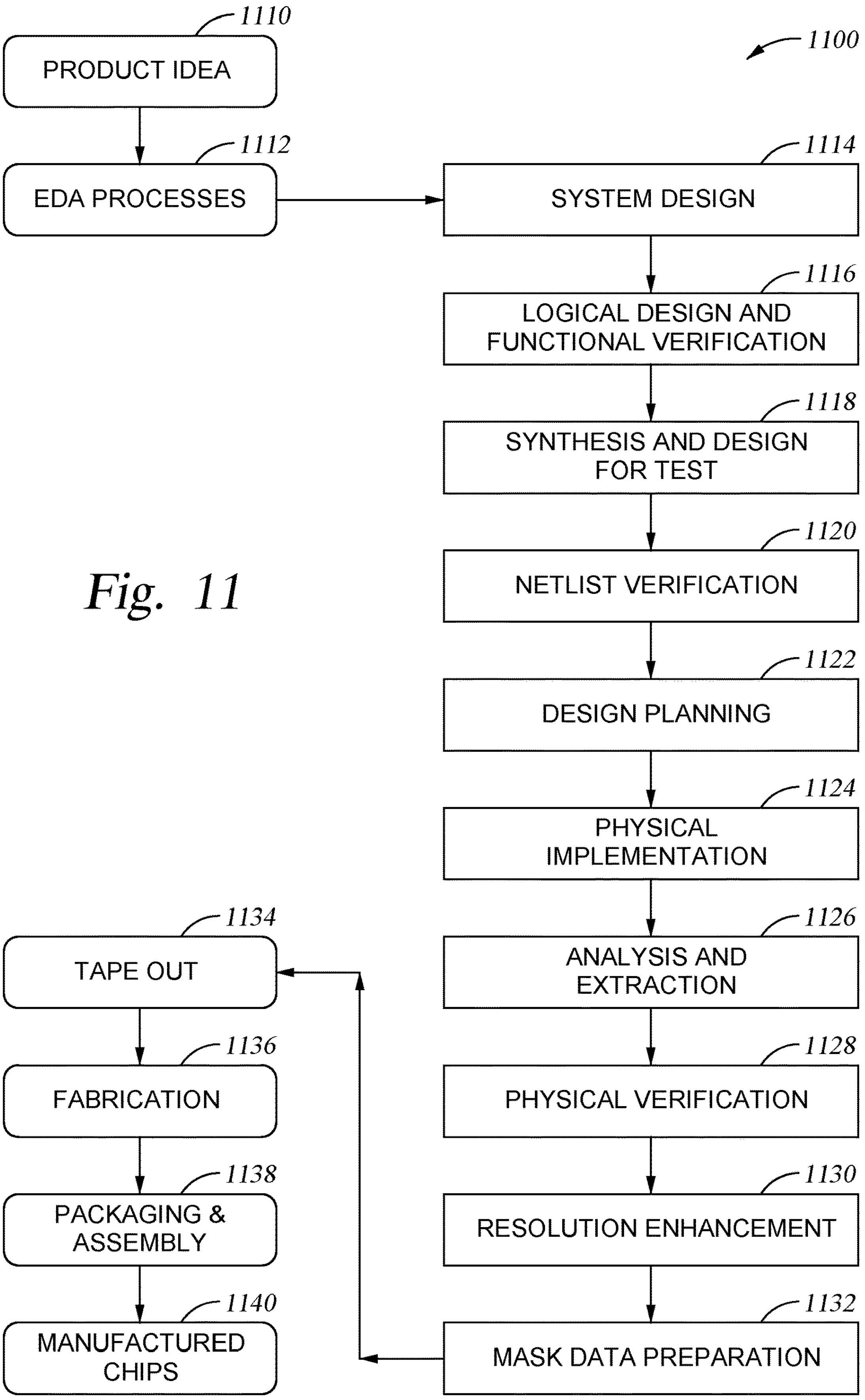
FIG. 11 depicts a flowchart of various processes used during the design and manufacture of an integrated circuit in accordance with some embodiments of the present disclosure.

FIG. 11 illustrates an example set of processes 1100 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1110 with information supplied by a designer, information which is transformed to create an article of manufacture that uses a set of EDA processes 1112. When the design is finalized, the design is taped-out 1134, which is when artwork (e.g., geometric patterns) for the integrated circuit is sent to a fabrication facility to manufacture the mask set, which is then used to manufacture the integrated circuit. After tape-out, a semiconductor die is fabricated 1136 and packaging and assembly processes 1138 are performed to produce the finished integrated circuit 1140.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 11. The processes described by be enabled by EDA products (or EDA systems).

During system design 1114, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1116, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1118, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1120, the netlist is checked for compliance with timing constraints and for correspondence with the HDL code. During design planning 1122, an overall floor plan for the integrated circuit is constructed and analyzed for timing and top-level routing.

During layout or physical implementation 1124, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1126, the circuit function is verified at the layout level, which permits refinement of the layout design. During physical verification 1128, the layout design is checked to ensure that manufacturing constraints are correct, such as DRC constraints, electrical constraints, lithographic constraints, and that circuitry function matches the HDL design specification. During resolution enhancement 1130, the geometry of the layout is transformed to improve how the circuit design is manufactured.

During tape-out, data is created to be used (after lithographic enhancements are applied if appropriate) for production of lithography masks. During mask data preparation 1132, the 'tape-out' data is used to produce lithography masks that are used to produce finished integrated circuits.

A storage subsystem of a computer system (such as computer system 1200 of FIG. 12) may be used to store the programs and data structures that are used by some or all of the EDA products described herein, and products used for development of cells for the library and for physical and logical design that use the library.

Figure 12:
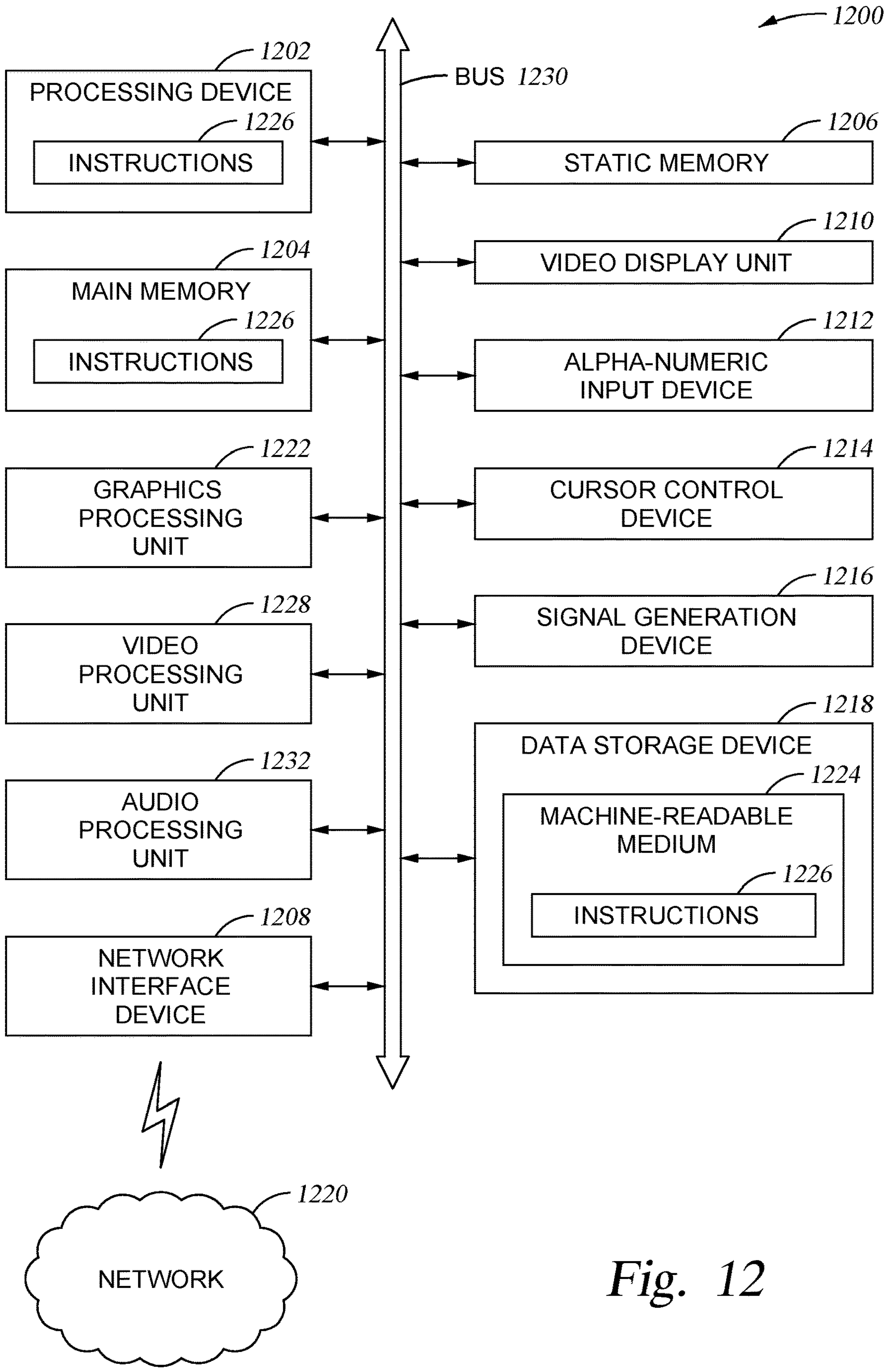
FIG. 12 depicts a diagram of an example computer system in which embodiments of the present disclosure may operate.

FIG. 12 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230.

Processing device 1202 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In some implementations, the instructions 1226 include instructions to implement functionality corresponding to the present disclosure. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1202 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
- receiving a circuit design and a safety relevant input;
- determining, by a processor, a first cone of influence and a first apex point of the first cone of influence based on the safety relevant input, wherein the first cone of influence includes first circuit elements of the circuit design;

determining a location of a first safety mechanism to be placed within the circuit design based on the first cone of influence and the first apex point; and
- positioning the first safety mechanism in the circuit design at the location corresponding to the first apex point.

2. The method of claim 1, wherein determining the first cone of influence and the first apex point comprises performing forward path tracing started from the safety relevant input within the circuit design, and wherein the first apex point is associated with a logical and structural convergent point within the first cone of influence.

3. The method of claim 1 further comprising receiving a constraint, and wherein the location of the first safety mechanism to be placed is further determined based on the constraint.

4. The method of claim 1 further comprising:
- receiving a constraint; and
- determining a second cone of influence based on the safety relevant input; and
- determining the location of the first safety mechanism to be placed within the circuit design based on comparison of the constraint with the first cone of influence and the second cone of influence.

5. The method of claim 4, wherein the constraint is one of a timing constraint and an area constraint.

6. The method of claim 1 further comprising:
- receiving a safety relevant output;
- determining a second cone of influence and a second apex point of the second cone of influence based on the safety relevant output; and determining a location of a second safety mechanism to be placed within the circuit design based on the second cone of influence and the second apex point.

7. The method of claim 6, wherein determining the second cone of influence and the second apex point comprises performing backward path tracing started from the safety relevant output within the circuit design.

8. A method comprising:

receiving a circuit design, a first location of a safety mechanism within the circuit design, and one of a safety relevant input or a safety relevant output;

determining, by a processor, a first cone of influence and a first apex point of the first cone of influence based on the one of the safety relevant input or the safety relevant output, wherein the first cone of influence includes first circuit elements of the circuit design; and positioning the safety mechanism at a second location within the circuit design based on comparing the first location of the safety mechanism to the first apex point, wherein the second location corresponds to the first apex point.

9. The method of claim 8, wherein receiving one of the safety relevant input or the safety relevant output comprising receiving the safety relevant input, and wherein determining the first cone of influence and the first apex point comprises performing forward path tracing from the safety relevant input within the circuit design.

10. The method of claim 8, wherein receiving one of the safety relevant input or the safety relevant output comprising receiving the safety relevant output, and wherein determining the first cone of influence and the first apex point comprises performing backward path tracing from the safety relevant output within the circuit design.

11. The method of claim 8 further comprising receiving a constraint, and wherein the first cone of influence and the first apex point are further determined based on the constraint.

12. The method of claim 11, wherein the constraint is one of a timing constraint and an area constraint.

13. A system comprising:

a memory storing instructions; and a processor, coupled with the memory and configured to execute the instructions, the instructions when executed cause the processor to:

receive a circuit design; perform path tracing within the circuit design to determine a first cone of influence and a first apex point of the first cone of influence, wherein the first cone of influence includes first circuit elements of the circuit design, and wherein the first apex point is associated with a logical and structural convergent point within the first cone of influence;

determine a location of a first safety mechanism to be placed within the circuit design based on the first cone of influence and the first apex point; and position the first safety mechanism in the circuit design at the location corresponding to the first apex point.

14. The system of claim 13, wherein the processor is further caused to receive a safety relevant input associated with the circuit design, and wherein performing the path tracing comprises performing forward path tracing from the safety relevant input within the circuit design.

15. The system of claim 14, wherein the processor is further caused to:

receive a safety relevant output;

determine a second cone of influence and a second apex point of the second cone of influence based on the safety relevant output; and determine a location of a second safety mechanism to be placed within the circuit design based on the second cone of influence and the second apex point.

16. The system of claim 15, wherein determining the second cone of influence and the second apex point comprises performing backward path tracing started from the safety relevant output within the circuit design.

17. The system of claim 13, wherein the processor is further caused to receive a safety relevant output associated with the circuit design, and wherein performing the path tracing comprises performing backward path from the safety relevant output within the circuit design.

18. The system of claim 13, wherein the processor is further caused to:

receive a constraint;

determine a second cone of influence; and determine the location of the first safety mechanism to be placed within the circuit design based on comparison of the constraint with the first cone of influence and the second cone of influence.

19. The system of claim 18, wherein the constraint is one of a timing constraint and an area constraint.

* * * * *